US007931962B1

(12) United States Patent
Willcockson et al.

(10) Patent No.: US 7,931,962 B1
(45) Date of Patent: Apr. 26, 2011

(54) PYROLIZING FLEXIBLE ABLATOR MATERIAL

(75) Inventors: William H. Willcockson, Morrison, CO (US); Suraj P. Rawal, Littleton, CO (US); Jarvis T. Songer, Golden, CO (US); Scott R. Stolpa, Littleton, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 12/778,997

(22) Filed: May 12, 2010

Related U.S. Application Data

(60) Provisional application No. 61/178,471, filed on May 14, 2009.

(51) Int. Cl.
*B32B 3/26* (2006.01)
(52) U.S. Cl. ............... 428/312.8; 428/920; 428/921; 244/159.1
(58) Field of Classification Search ............ 428/312.8, 428/920, 921; 244/159.1, 158.1, 159.2, 171.7, 244/172.6, 171.8, 121
See application file for complete search history.

(56) References Cited

U.S. PATENT DOCUMENTS

| | | | | |
|---|---|---|---|---|
| 3,622,659 A * | 11/1971 | Sonia et al. | .......... | 264/220 |
| 3,826,708 A * | 7/1974 | Dervy | .......... | 428/44 |
| 4,151,800 A | 5/1979 | Dotts et al. | | |
| 4,255,483 A * | 3/1981 | Byrd et al. | .......... | 442/136 |
| 4,364,991 A * | 12/1982 | Byrd et al. | .......... | 442/142 |
| 4,652,471 A * | 3/1987 | van Rooden et al. | .......... | 427/411 |
| 4,804,571 A | 2/1989 | Jouffreau | | |
| 6,007,026 A | 12/1999 | Shorey | | |
| 6,013,361 A * | 1/2000 | Seal et al. | .......... | 428/297.4 |
| 6,136,418 A * | 10/2000 | Martin et al. | .......... | 428/195.1 |
| 6,264,144 B1 * | 7/2001 | Thornton | .......... | 244/159.2 |
| 6,558,785 B1 * | 5/2003 | Rawal et al. | .......... | 428/312.8 |
| 6,592,981 B1 * | 7/2003 | Rawal et al. | .......... | 428/312.8 |
| 7,510,754 B2 | 3/2009 | DiChiara et al. | | |

OTHER PUBLICATIONS

NASA Selects Material for Orion Spacecraft Heat Shield, Science Daily, http://www.sciencedaily.com/releases/2009/04/090409153909.htm.
F.S. Milos et al., "Ablation And Thermal Response Property Model Validation For Phenolic Impregnated Carbon Ablator", American Institute Of Aeronautics and Astronautics, 47th AIAAA Aerospace Sciences Meeting, Jan. 5-8, 2009.
"Inflatable Re-Entry Vehicle Experiment", NASAfacts, Aeronatucs Research Mission Directorate, Aug. 13, 2009.
D.J. Rasky et al., "Thermal Protection System Materials And Costs For Future Reusable Launch Vehicles", Engineering Notes, J. Spacecraft, vol. 38, No. 2, pp. 294-296, 2000.
P. Willis, "Survey of Radiation Effects on Materials", Jet Propulsion Laboratory, Presentation at the OPFM Instrument Workshop, Jun. 3, 2008.

* cited by examiner

*Primary Examiner* — N. Edwards
(74) *Attorney, Agent, or Firm* — McDermott Will & Emery LLP

(57) ABSTRACT

A pyrolyzing flexible ablator comprising a flexible substrate and a pyrolyzing material that will pyrolize upon exposure to a heat flux greater than 5 W/cm$^2$, the pyrolyzing material being bonded to the flexible substrate.

23 Claims, 9 Drawing Sheets

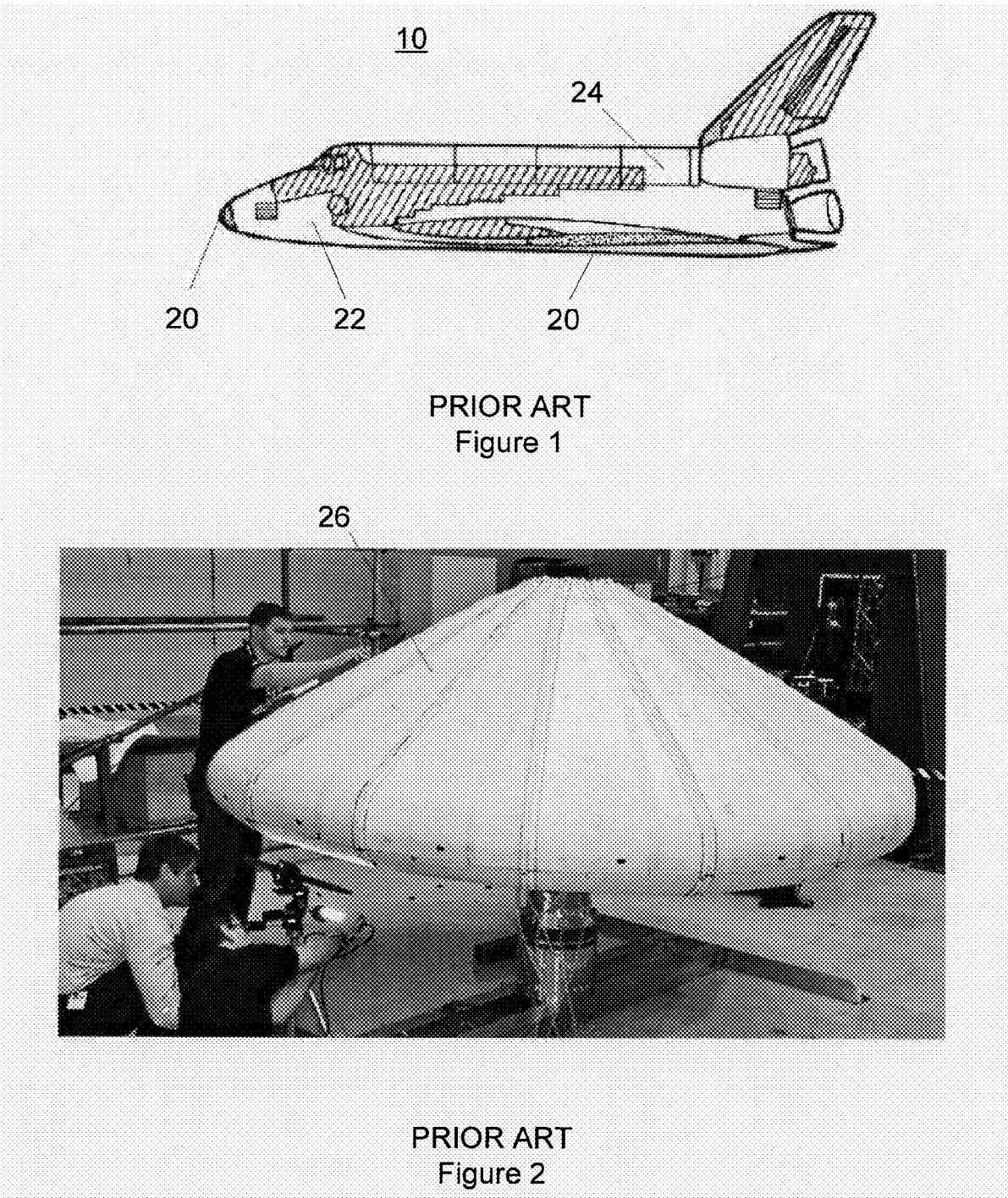
PRIOR ART
Figure 1
PRIOR ART
Figure 2

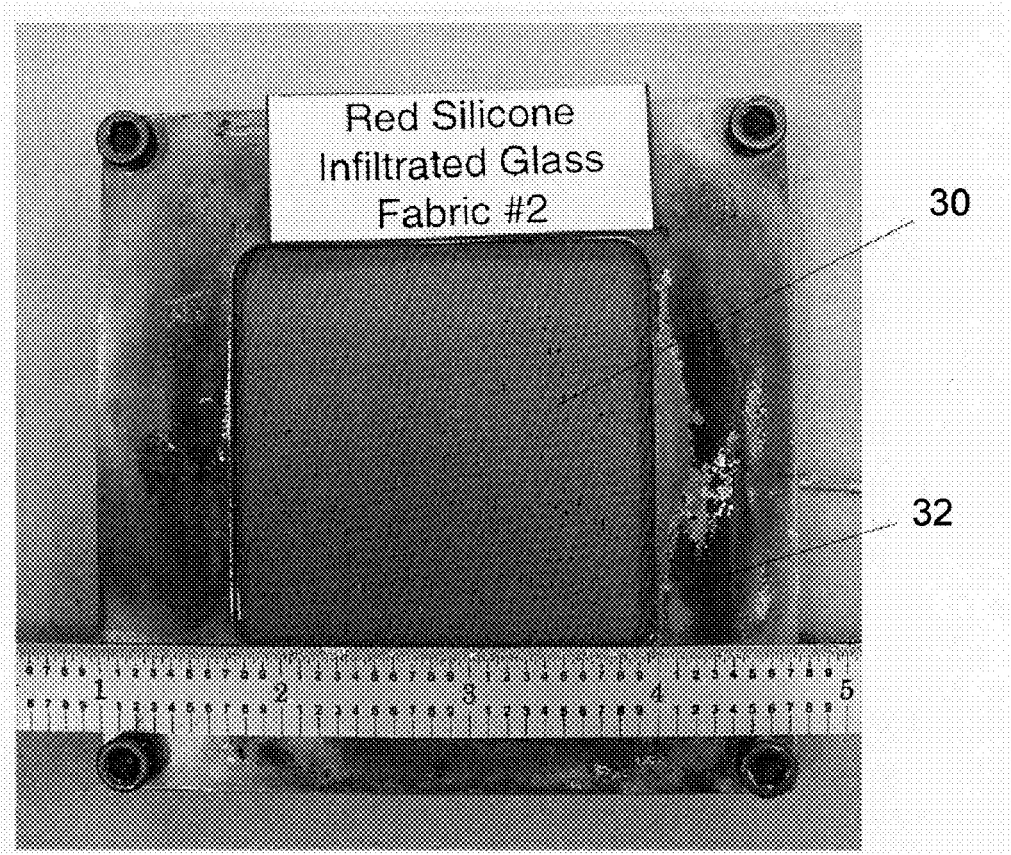
Figure 3A
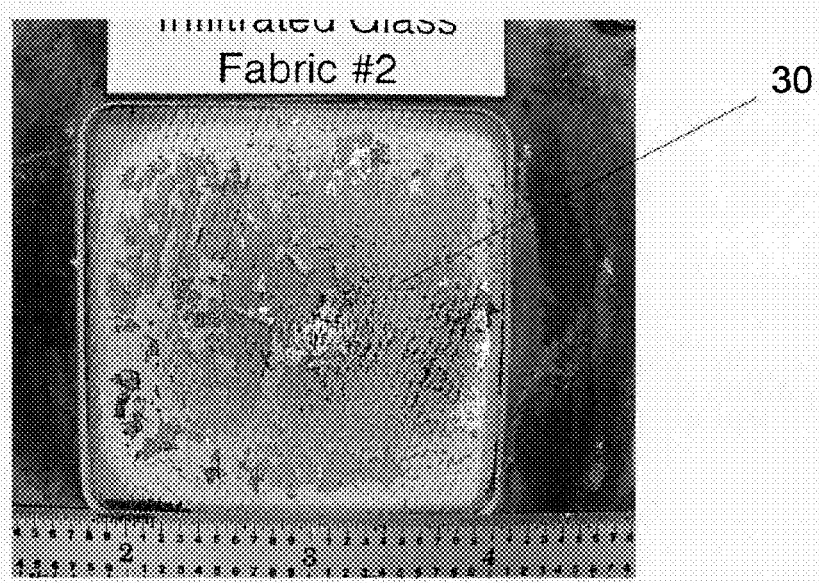
Figure 3B

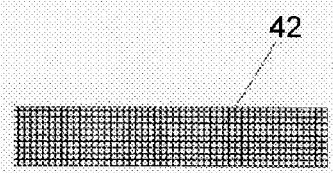
Figure 4A
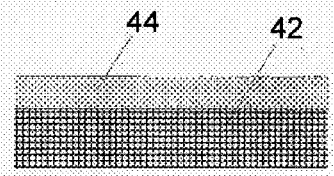
Figure 4B
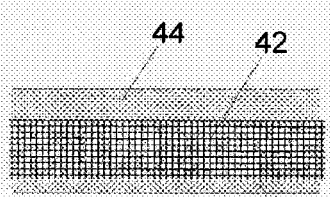
Figure 4C
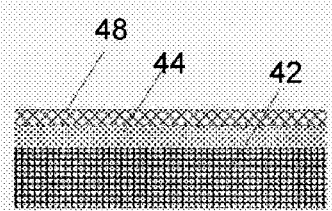
Figure 4D

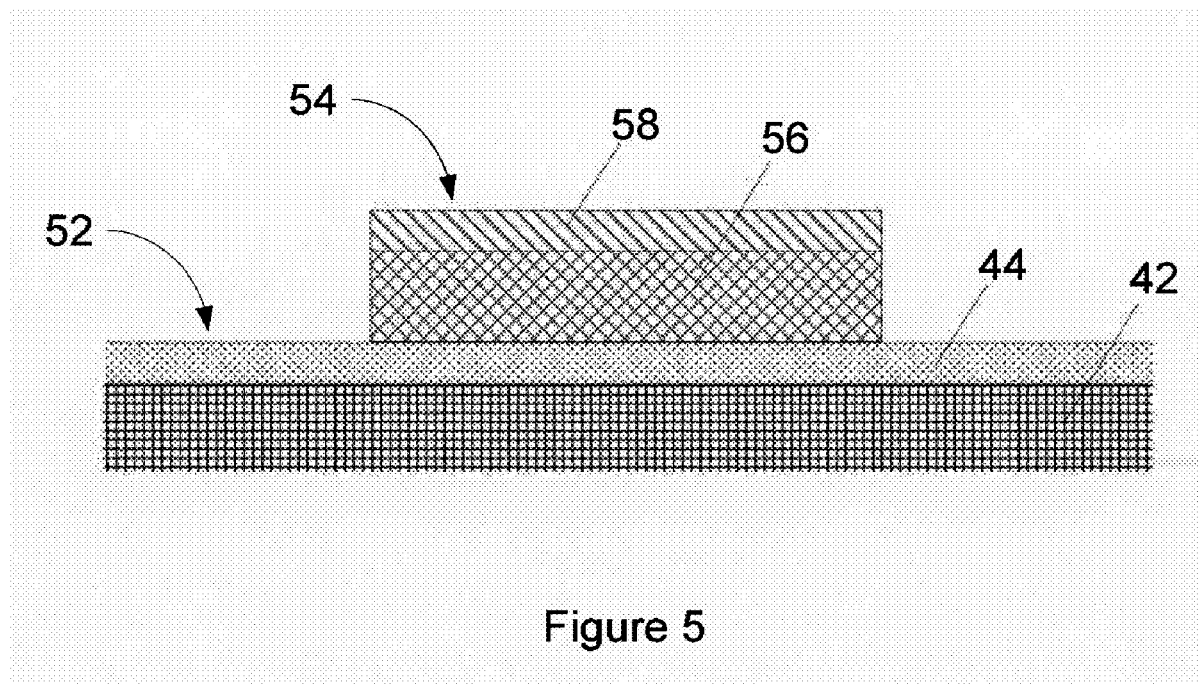
Figure 5

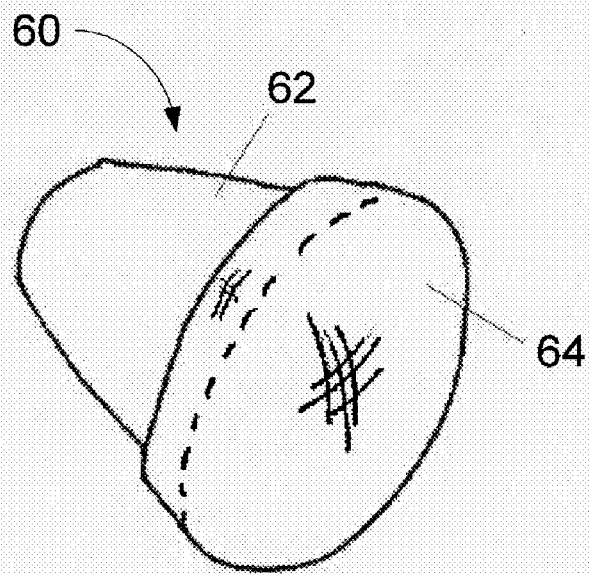
Figure 6A
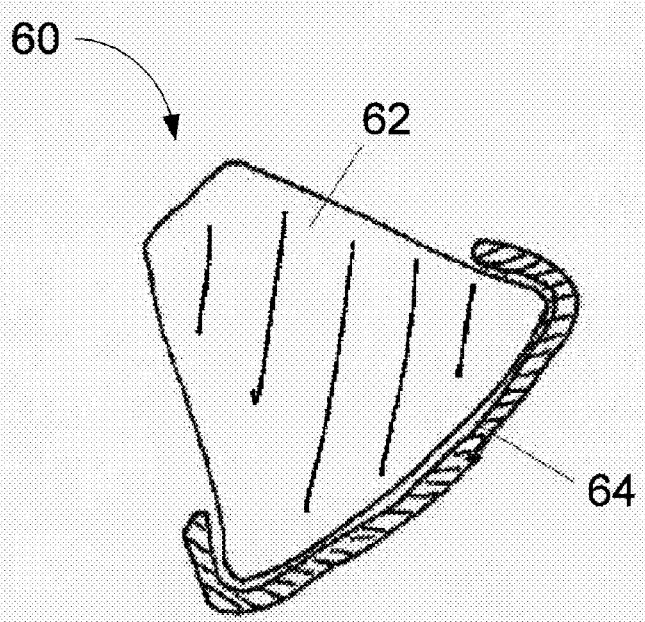
Figure 6B

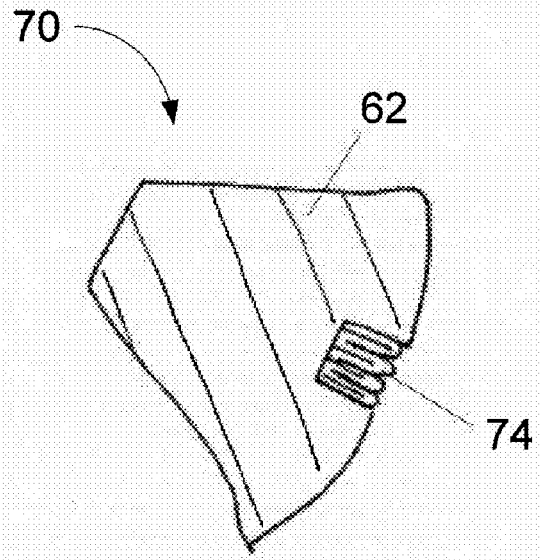
Figure 7A
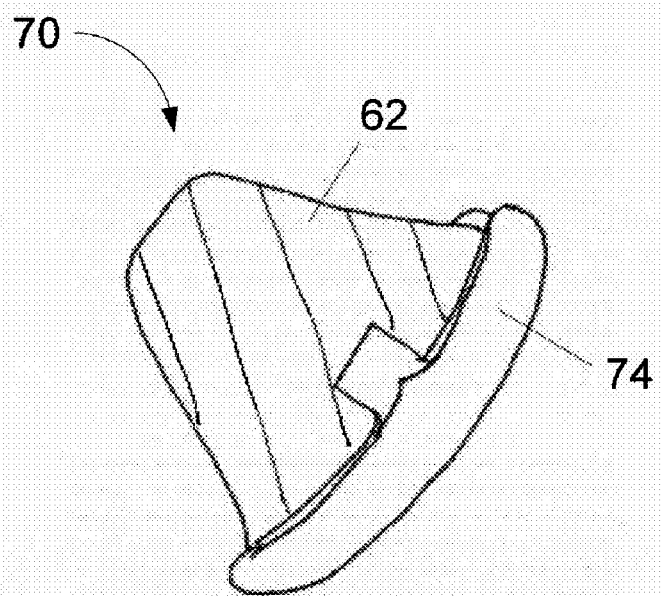
Figure 7B

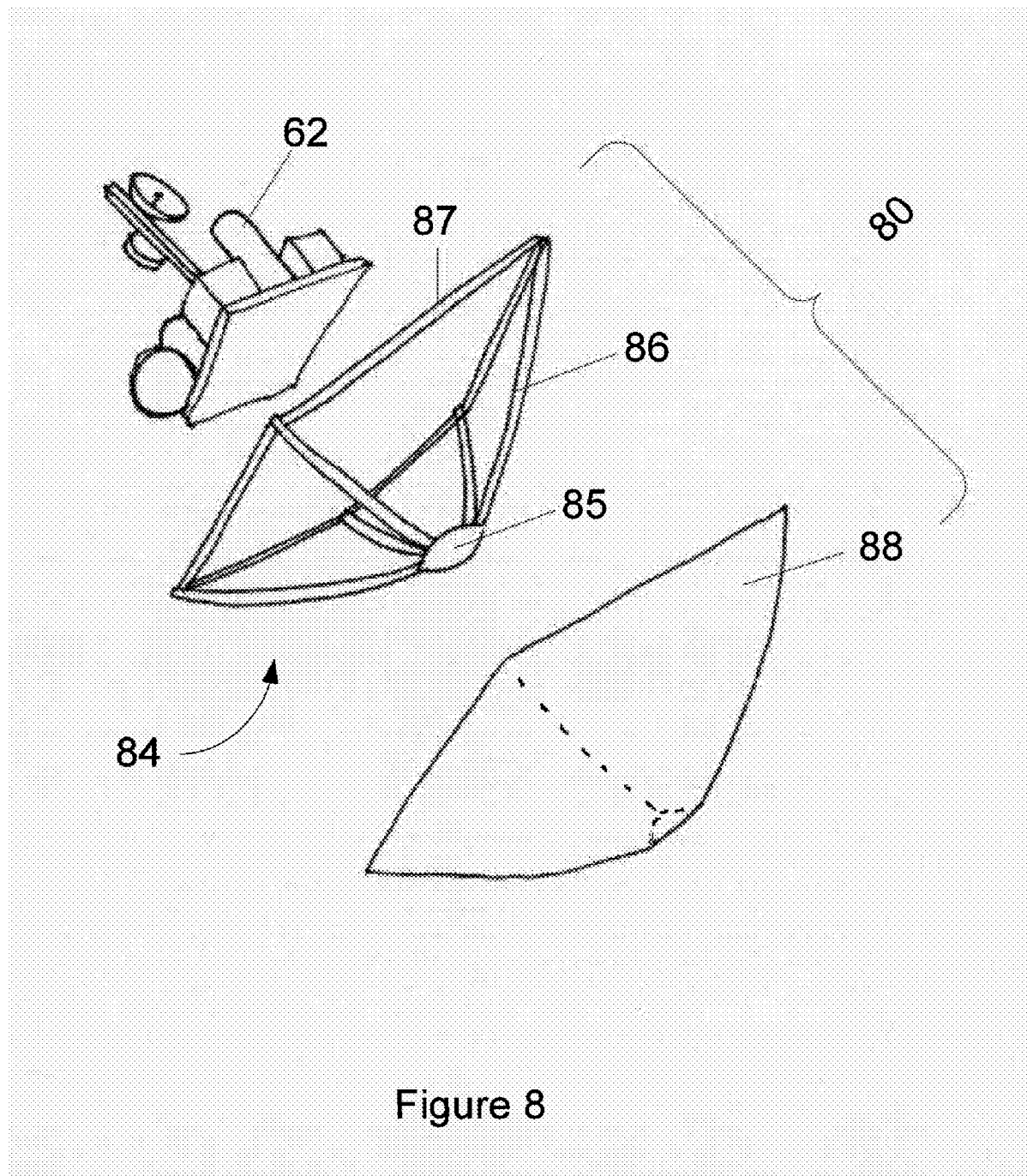
Figure 8

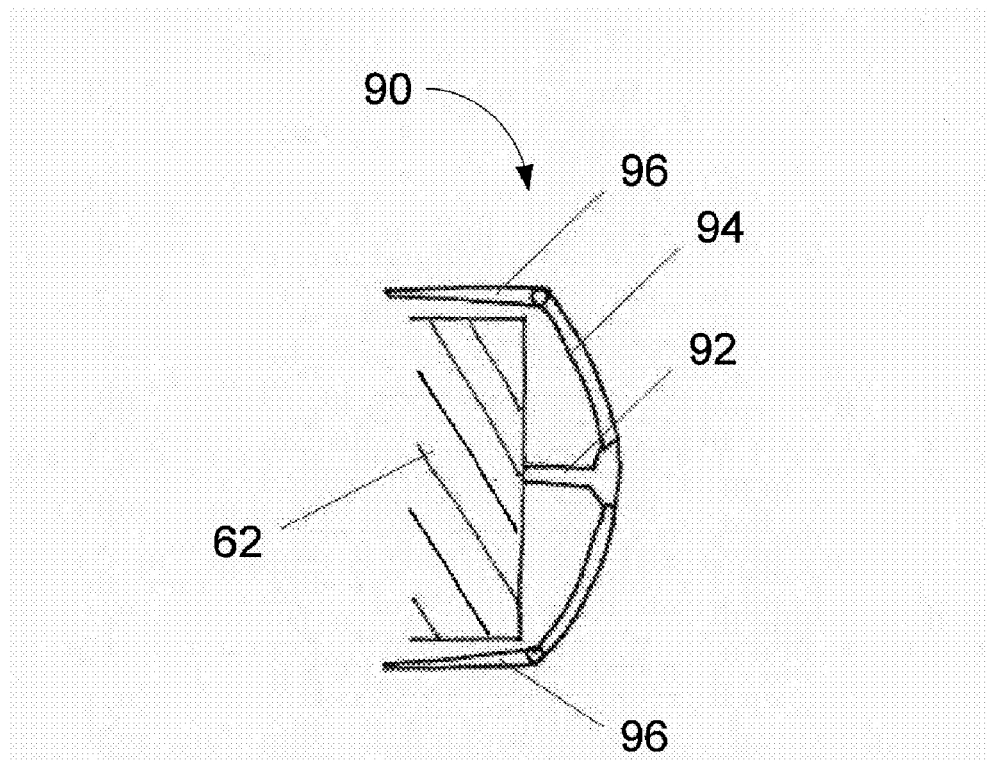
Figure 9A
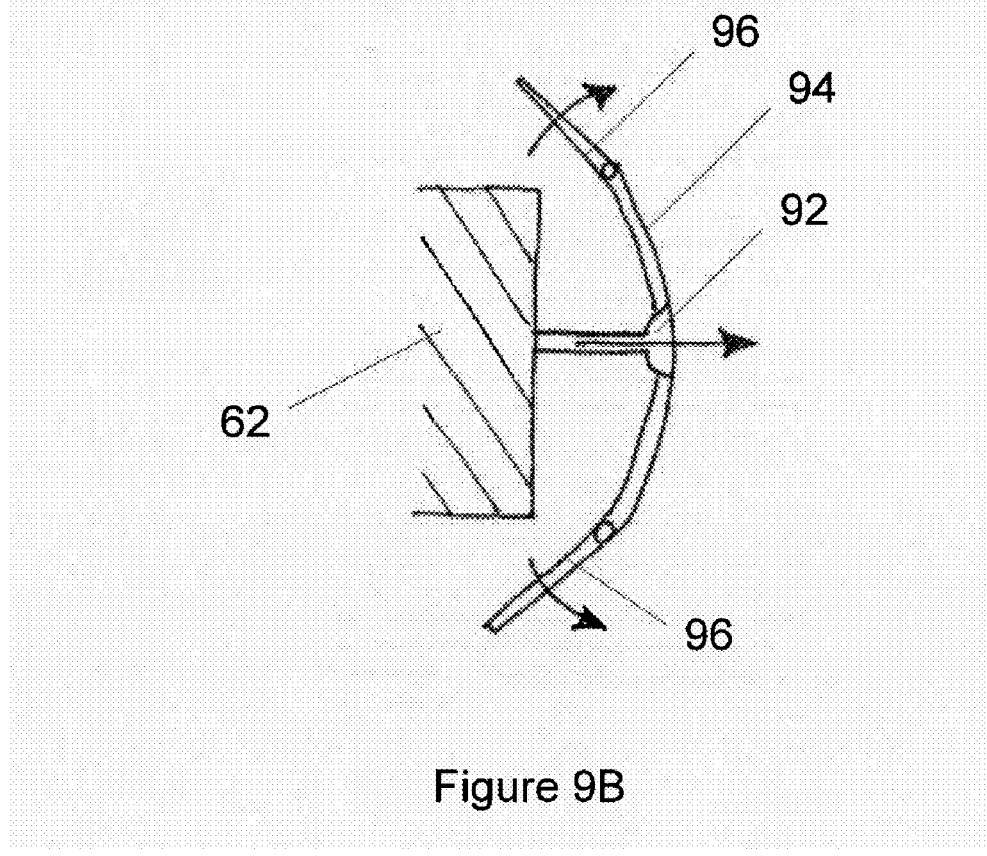
Figure 9B

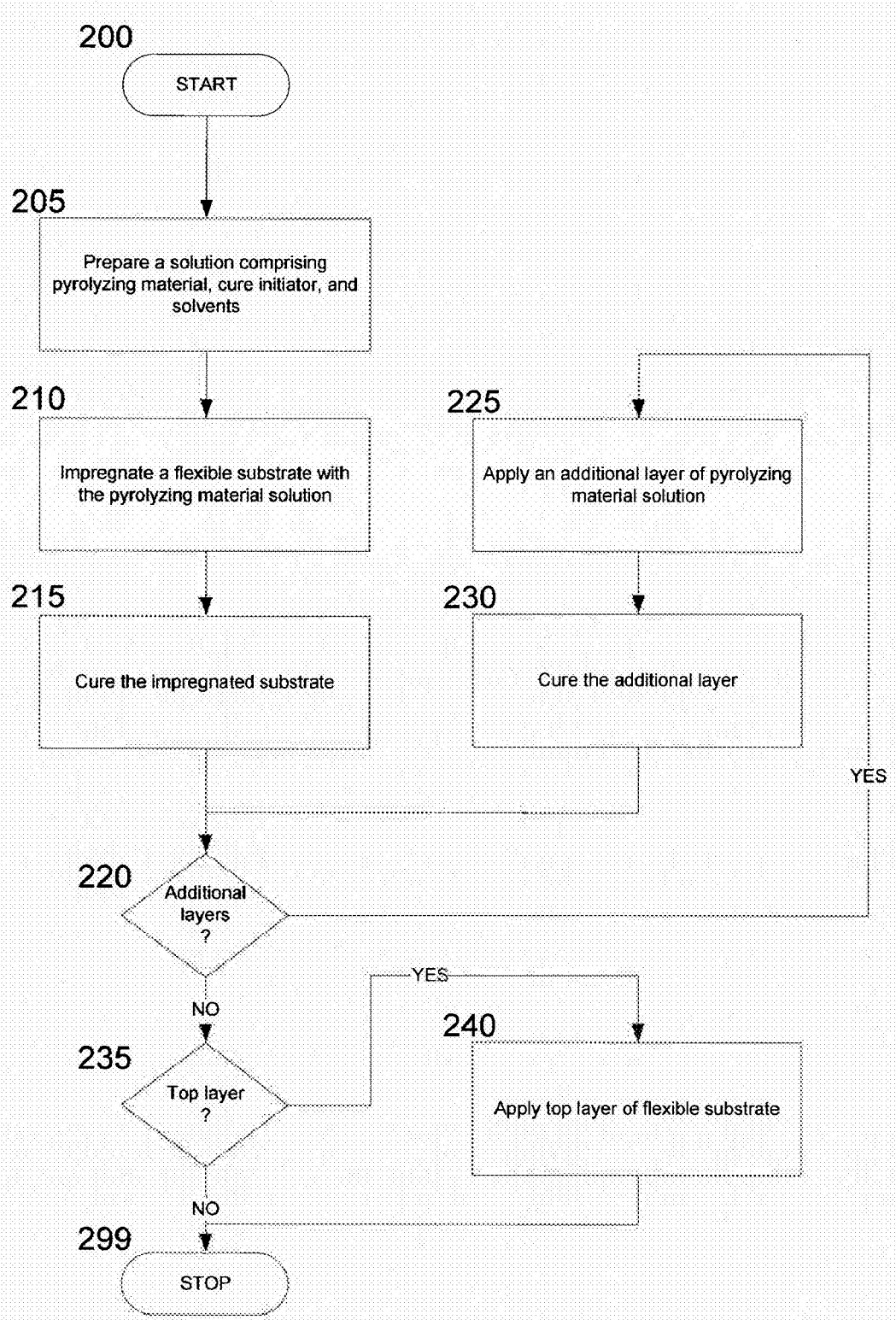
Figure 10

PYROLIZING FLEXIBLE ABLATOR MATERIAL

This application claims the benefit of priority under 35 U.S.C. §119 from U.S. Provisional Patent Application Ser. No. 61/178,471 entitled "PYROLIZING FLEXIBLE ABLATOR MATERIAL," filed May 14, 2009, which is incorporated by reference in its entirety for all purposes.

STATEMENT REGARDING FEDERALLY SPONSORED RESEARCH OR DEVELOPMENT

Not applicable.

BACKGROUND

1. Field

The present disclosure generally relates to thermal protection materials and, in particular, to thermal protection systems using a pyrolizing ablative material.

2. Description of the Related Art

Every reentry spacecraft, such as an unmanned capsule or the Space Shuttle, requires some form of thermal protection if it is to survive the intense heat generated during atmospheric entry. Orbital or interplanetary spacecraft typically enter the atmosphere at hypersonic speed, creating a high-pressure bow shock wave in front of the vehicle. Within this shock wave, the compressed gas can reach temperatures of more than 6,000 kelvin (K), causing it to become both ionized and dissociated. This hot gas then transfers its heat to the front of the spacecraft.

One way to dissipate this large amount of thermal energy is with a heat shield on the front of the spacecraft that works by ablation, which is the process wherein the material of the heat shield melts, sublimes, and/or chemically decomposes. Phase change and endothermic chemical reactions of the heat shield material absorb energy from the shock layer gases, preventing it from reaching the spacecraft structure. Chemical reactions of the surface and near subsurface heat shield material (charring) may also produce gaseous products known as pyrolysis gases. Gas produced by pyrolysis of the heat shield material carries heat away from the spacecraft and may also block convective and radiative heat flux from reaching the spacecraft. This technique was used on the Mercury, Gemini, and Apollo programs to protect the spacecraft during re-entry in a very mass-efficient manner. Ablative heat shields provide good protection against high heat flux by a combination of chemical reactions, material phase change, and surface blowing (lifting hot shock layer gases away from the heat shield's outer wall as gases are generated at the surface of the heat shield).

One lightweight ablative heat shield material is SLA-561V ("SLA" stands for Super Lightweight Ablator), a proprietary ablative made by Lockheed Martin that has been used as the primary heat shield material on many of the vehicles sent by the National Aeronautics and Space Administration (NASA) to Mars. SLA-561V begins to exhibit ablation at a heat flux of approximately 110 $W/cm^2$. This material is typical of most existing ablators in that it is applied to a rigid & continuous sub-structure.

The Space Shuttle orbiter uses a variety of thermal protection materials on various parts of the body. FIG. 1 shows some of the areas of the orbiter 10 where different types of material are used. Reinforced carbon-carbon 20 is used in the nose cap and leading edges of the wing where the reentry temperature exceeds 1260 degrees Celsius (C) (~2300 degrees Fahrenheit (F)). Flexible felt Reusable Surface Insulation (FRSI) 24, bonded to the rigid underlying sub-structure, is used in areas where temperatures stay below 370 degrees C. (~700 degrees F.).

Some of the low-temperature rigid tiles originally used on section of the fuselage, tail, and upper wing on orbiters Discovery, Atlantis and Columbia were replaced with Advanced Flexible Reusable Surface Insulation (AFRSI) in areas where the temperatures remain below 650 degrees C. (~1200 degrees F.). AFRSI consists of a low-density fibrous batting made of high-purity silica fibers that is sandwiched between an outer woven silica high-temperature fabric and an inner woven glass lower-temperature fabric. After the composite is sewn with silica thread, it has a quilt-like appearance. Both FRSI and AFRSI are bonded to rigid sub-structure (i.e. they are not structurally self-supporting) and are limited to low heat flux levels, with FRSI generally limited to 2 $W/cm^2$ and AFRSI generally limited to 5 $W/cm^2$.

SUMMARY

This disclosure describes a flexible heat shield material that provides protection for spacecraft during reentry when the heat flux is greater than 5 $W/cm^2$. The heat shield incorporates a flexible structural substrate made of a high-strength, high-temperature material such as ceramic, carbon, or glass fibers and a low-strength material that releases gas through pyrolysis when exposed to the heat of reentry. This gas carries away a large part of the heat generated during reentry, protecting the spacecraft from temperatures that would otherwise destroy the structure and equipment. The pyrolyzing material may be impregnated into the flexible substrate and/or applied as a coating on one or both sides of the flexible substrate. As the pyrolyzing material will be ablated away during reentry, this new flexible heat shield material is called a pyrolyzing flexible ablator.

The flexibility of this material allows it to be used to construct deployable thermal protection systems that can handle heat flux rates higher than previous deployable heat shields. In this application, a deployable system can either be an inflatable system or a mechanically unfolding one. A deployable heat shield occupies a small volume during launch, when space within the launch vehicle fairing is at a premium, and then can be expanded to a large volume after reaching orbit to protect the spacecraft during reentry. This type of flexible protective blanket does not require continuous support and can alternately be draped over a framework to form a heat shield, providing a reduction in weight of both the heat shield and the supporting structure compared to rigid heat shield materials that require continuous supporting structure. In this application, such a framework can be either a fixed geometry or a foldable structure as mentioned above.

A pyrolyzing flexible ablator is disclosed. The pyrolyzing flexible ablator comprises a flexible substrate and a material that will pyrolize upon exposure to a heat flux greater than 5 $W/cm^2$. The pyrolyzing material is bonded to the flexible substrate.

A thermal protection system is disclosed. The thermal protection system includes a pyrolyzing flexible ablator comprised of a material that will pyrolize upon exposure to a heat flux greater than 5 $W/cm^2$ bonded to a flexible substrate. The pyrolyzing flexible ablator is configured to form a flexible structure.

A method of forming a pyrolyzing flexible ablator is disclosed. The method consists of the steps of impregnating a first flexible substrate with a pyrolyzing material that, when cured, will pyrolize upon exposure to a heat flux greater than 5 $W/cm^2$, and curing the pyrolyzing material.

In the following description, specific examples are described to shown by way of illustration how the system and method may be practiced. It is to be understood that other configurations may be utilized and changes may be made without departing from the scope of the present claims.

BRIEF DESCRIPTION OF THE DRAWINGS

FIG. 1 illustrates some of the various types of thermal protection systems used on the Space Shuttle orbiter.

FIG. 2 is a photograph of the Inflatable Re-entry Vehicle Experiment.

FIGS. 3A and 3B illustrate a prototype flexible pyrolyzing ablator according to certain aspects of the present disclosure.

FIGS. 4A-D illustrate various constructions of a flexible pyrolyzing ablator according to certain aspects of the present disclosure.

FIG. 5 illustrates an example construction of a flexible structure as part of a thermal protection system according to certain aspects of the present disclosure.

FIGS. 6A-B illustrates an example flexible structure as part of a thermal protection system according to certain aspects of the present disclosure.

FIGS. 7A-B illustrates an example inflatable flexible structure as part of a thermal protection system according to certain aspects of the present disclosure.

FIG. 8 illustrates an example of a flexible structure supported by a spar structural framework as part of a thermal protection system according to certain aspects of the present disclosure.

FIGS. 9A-B illustrates an example construction of a deployable spar structural framework as part of a thermal protection system according to certain aspects of the present disclosure.

FIG. 10 is a flowchart of an example process for fabricating a pyrolyzing flexible ablator according to certain aspects of the present disclosure.

DETAILED DESCRIPTION

To overcome at least some of the disadvantages of the existing flexible thermal protection materials listed above, there is a need for a flexible heat shield material that can handle heat flux in excess of 5 W/cm$^2$. In addition, it is desirable that the heat shield material have sufficient strength to enable the use of a framework support structure instead of a continuous supporting structure.

A lightweight flexible thermal protection system (TPS) is disclosed that incorporates a pyrolyzing flexible ablator and is suitable for, among other applications, reentry protection of spacecraft. Advanced reentry technology relies on lightweight TPSs to protect the vehicle from heating in the atmospheric flight. Such reentry technology can be applied to a range of missions including direct entry from deep space, reentry from low planetary orbit, and aerocapture into orbit. In addition, lightweight TPSs can make existing backshells lighter and create new opportunities for extended forebody decelerators such as inflatable systems which have potential advantages in mass and packaging efficiency over current aeroshell technology.

An example of a lightweight TPS is the Inflatable Re-entry Vehicle Experiment (IRVE) 26, shown in FIG. 2 in the laboratory prior to test. The IRVE was a technology demonstrator developed by NASA to evaluate inflatable aeroshells for future missions. Fully deployed, the IRVE 26 was almost 3 meters (10 feet) wide. The IRVE 26 flexible forebody was not designed for significant heating and was exposed to less than 2 W/cm$^2$ in the test of August 2009.

Materials that are suitable to provide pyrolytic protection as part of a TPS are characterized by being solid at room temperature and pressure and undergoing chemical decomposition and/or phase change at the temperatures and pressures experienced during reentry. The low mechanical strength that these materials have by themselves is typically insufficient to withstand the stresses created by the dynamic pressure of the reentry environment, where pyrolyzing materials by themselves would fracture or spall, resulting in a loss of protection to the spacecraft.

Materials that have the high mechanical strength to survive the stresses created by the dynamic pressure of the reentry environment while at the high temperatures experienced during reentry typically do not sublime in the reentry environment. One high-temperature high-strength fabric currently available is made from Nextel®, a family of ceramic fibers containing various amounts of $Al_2O_3$, $SiO_2$, and $B_2O_3$ depending on the specific product. Blankets created from this type of fabric do not provide ablative protection and simply provide a heat resistant surface and conductive insulation, which limits Nextel® to a predicted maximum heating rate of 20-28 W/cm$^2$.

The disclosed system combines a low-strength pyrolyzing material with a high-temperature high-strength flexible material to create a pyrolyzing flexible ablator (PFA). By combining the two materials, a strong yet flexible material capable of withstanding higher heat fluxes than existing flexible blanket-type TPSs can be achieved. The pyrolyzing material, at the temperatures and heat fluxes associated with a range of reentry trajectories, absorbs energy through chemical decomposition and provides further heat flux reduction through boundary layer modification. Suitable pyrolyzing material may include, for example and without limitation, silicones, phase-change materials, fluoropolymers, and other polymeric materials. Choice of a pyrolyzing material for a specific application depends, among other considerations, on the duration and profile of the heat flux and temperature predicted for a particular mission.

The maximum service temperature of the high-strength fabric is limited by the melting temperature of the material from which the fabric is made. Most materials have a melting temperature at which the material abruptly changes phase from a solid to a liquid. Some materials, glass in particular, do not exhibit an abrupt change in phase but rather exhibit a slow softening characterized by a loss of strength and stiffness. The equivalent point in this softening curve to a melting point is called the "glass transition temperature" and represents an approximate "knee" in the strength vs. temperature curve for a material. A material will have either a melting temperature or a glass transition temperature. Suitable high-temperature high-strength fabrics may be made from, for example and without limitation, materials such as Nextel® and Nicalon™, which include one or more of $Al_2O_3$, silicon dioxide ($SiO_2$), boron trioxide ($B_2O_3$), and silicon carbide (SiC), zirconia ($ZrO_2$), hafnia ($HfO_2$), fiberglass of various compositions including ceramic fibers, silica ($SiO_2$) fibers, and carbon fibers or nanotubes. The fabrics may be formed by one or more of weaving fibers, roving, or yarn comprising these materials into any of a variety of patterns or forming a non-woven layer or "felt" of continuous or individual fibers, where a plurality of layers of different types may be assembled into a "blanket" having greater thickness. While woven fabrics are one form of flexible substrates that may be used to form a pyrolyzing flexible ablator and will be used as examples herein, other forms of flexible materials having sufficient strength at the temperatures experienced by a heat shield are possible.

FIGS. 3A and 3B illustrate a prototype PFA according to certain aspects of the present disclosure. FIG. 3A shows a sample of PFA 30 prior to exposure to a high-temperature plasma jet. A silica glass fabric was impregnated with silicone which was then cured, forming a PFA 30. The PFA 30 is clamped into a metal fixture 32. Preliminary plasma jet testing of this PFA 30 has shown that it will withstand heating rates of 80 W/cm$^2$, more than doubling the heat capability of Nextel®. FIG. 3B shows the same test sample of PFA 30 after completion of 20 seconds of exposure to the 80 W/cm$^2$ plasma jet, where it can be seen that some of the silicone is now gone yet the PFA 30 is unbreached.

Evaluation has been performed on PFAs having thicknesses in the range of 0.010 to 0.150 inches and with the pyrolyzing material forming 25-40% of the total mass of the impregnated sheet, although higher and lower percentage compositions are feasible. The samples that have performed the best have been between 0.026 and 0.033 inches in thickness. Additional pyrolyzing material layers may add 0.003-0.007 inches or more to the thickness of the base fabric in a PFA, depending on the mission.

FIGS. 4A-D illustrate various constructions of a flexible pyrolyzing ablator according to certain aspects of the present disclosure. FIG. 4A shows a cross-section of a PFA 42 comprised of a flexible substrate such as fiberglass cloth that has been impregnated with a pyrolyzing material (not shown separately) such as silicone. The pyrolyzing material bonds to the flexible substrate during the cure process. The preparation of materials suitable for use a pyrolyzing material and the techniques of impregnating flexible substrates and curing the impregnated material are well known to those of ordinary skill in the art.

FIG. 4B shows a cross-section of a PFA comprising a layer 44 of pyrolyzing material on one side of the impregnated substrate 42 of FIG. 4A. This construction may be formed by providing an amount of pyrolyzing material that is in excess of what can be absorbed by the fabric and allowing the excess to remain on the surface of the fabric during cure. In this manner, layer 44 will be continuous with the pyrolyzing material embedded in the fabric of layer 42. Alternately, layer 42 may be impregnated with the pyrolyzing material in a first step and then an additional quantity of liquid pyrolyzing material may be spread over layer 42 to form layer 44 before or after layer 42 is cured. Depending on the characteristics of the pyrolyzing material, layer 44 may form a bond directly to the pyrolyzing material embedded in layer 42 or may require a bonding agent between layers 42 and 44. The composite sheet of PFA may be placed on the spacecraft such that layer 44 is on the exterior surface of the composite sheet of PFA where it is more fully exposed to the heating environment and may provide an increased level of ablative protection.

FIG. 4C shows a cross-section of a PFA similar to that of FIG. 4B wherein impregnated substrate 42 has layers 44 and 46 of pyrolyzing material on both sides. Layers 44 and 46 may be formed and attached to layer 42 in one or more of the processes described for FIG. 4B. The two layers 44 and 46 of pyrolyzing material may be of different thicknesses and may be of different materials as well.

FIG. 4D shows a cross-section of a PFA having a single layer 44 of pyrolyzing material applied to one side of impregnated substrate 42 with an additional layer 48 of a structural substrate applied over layer 44. Layer 48 may be different from the substrate that is part of layer 42 in material or construction, and may or may not have a pyrolyzing material impregnated into the structural substrate. Layers 48 may be bonded to layer 44 or layer 48 may be mechanically attached, such as by stitching, to layer 42. Layer 48 may have a more open weave or structure than that of layer 42 so as to allow gas evolved from the pyrolyzing material in layers 44 and 42 to easily escape. This construction may provide increased mechanical strength while still allowing the pyrolyzing material to pyrolize and carry away heat. An alternate example construction method for the construction of FIG. 4D is to assemble a fabric blanket having a tightly woven layer 42, a low-density non-woven layer 44, and a loosely woven layer 48, with these three layers stitched together using thread of the same material as the layers. The blanket is then impregnated with a pyrolyzing material and cured. The resulting PFA has a continuous structure as the pyrolyzing material impregnated into layers 42, 44, and 48 is cured as a single element in addition to the mechanical stitching.

FIG. 5 illustrates an example construction of a flexible structure as part of a thermal protection system according to certain aspects of the present disclosure. It may be desirable to tailor the heat resistance of a thermal protection system in order to minimize the total weight of the total system. In this example, sheet 52 of PFA is locally reinforced with a sheet 54 of PFA. This type of reinforcement may be provided, for example, in areas where the heat flux is higher than a single sheet of PFA can survive or an area that experiences longer exposure to significant heat flux during a reentry. Sheet 52 is, in this example, constructed with a layer 42 of flexible substrate impregnated with a pyrolyzing material coated on one surface with a layer 44 of the same pyrolyzing material. Sheet 52 comprises, in this example, a layer 56 of flexible substrate that is different from the flexible substrate of layer 42 and a layer of pyrolyzing material 58 that, in this example, is different from the material of layers 42 and 44. In other configurations, layers 56 and 58 may be the same material as used in layers 42 and 44, and sheets 52 and 54 may be constructed with additional layers of pyrolyzing material and/or flexible substrate with or without impregnation with pyrolyzing material. In alternate configurations, multiple layers of PFA may be laminated together through a variety of attachment methods, including stitching, bonding, and mechanically clamping. The layers may be arranged in any sequence, with the smaller section on the exterior or interior surface of the largest layer or sandwiched between two larger layers.

The proposed system provides potential for lighter aeroshells through two avenues. First in the relatively low heating regime of existing aeroshell backshells, the ability to use thin-gauge lightweight flexible TPS materials can provide mass savings both through inherent thinner ablative layering as well as through potential reduction of underlying support structure. This latter efficiency is allowed by draping flexible TPS over a spar structural framework rather than a continuous structural surface as is done with current aeroshells. The second avenue is through the enabling of flexible inflatable aeroshells which by their very nature require flexible TPS. These in-flight deployable systems may provide more efficient entry bodies by enabling lower mass per unit area decelerators as well as better packaging efficiency through elimination of launch shroud constraints.

FIGS. 6A-B illustrate an example flexible structure 64 as part of a thermal protection system according to certain aspects of the present disclosure. FIG. 6A provides a perspective view illustrating how, in this example, sheets of PFA have been cut and sewn together to form a flexible structure 64 shaped to conform to the end of payload section 62 of spacecraft 60 that will be facing forward along the flight path. FIG. 6B is a cross-section that illustrates how the flexible structure 64 is supported continuously by the outer surface of the payload section 62. The flexible structure 64 may be attached to payload section 62 by any of a variety of methods, including bonding of the flexible structure 64 to the payload section 62 over a portion of the surface of payload section 62 that is covered by flexible structure 64 and/or mechanically fastening flexible structure 64 to the payload section 62 using fasteners such as, for example, bolts, screws, rivets, or straps. While rigid thermal protection system could be used in an application such as this, a PFA shield may offer a lower cost to manufacture or install as well as lower weight TPS compared to a rigid system.

FIGS. 7A-B illustrate an example inflatable flexible structure as part of a TPS according to certain aspects of the present disclosure. In the FIG. 7A, spacecraft 70 has a payload section 62 that contains a compartment containing, in this example, a packed inflatable TPS 74 constructed of sheets of PFA. This illustration would be typical of a launch configuration where space is at a premium within the launch fairing. The inflatable TPS 74 can be packed very tightly, down to the basic volume of the sheets of PFA. FIG. 7B shows the same spacecraft 70 after inflation of the TPS 74. In this example, the inflated TPS 74 forms a shield around the large end of the structure and payload section 62. Inflatable TPSs may be configured in a variety of other configurations depending on the spacecraft design and mission. Construction of an inflatable TPS and attachment of the TPS to a spacecraft use techniques well known to those of ordinary skill in the art.

FIG. 8 illustrates an example of a PFA flexible structure supported by a spar structural framework according to certain aspects of the present disclosure. This separated view shows the spacecraft's structure and payload section 62 and TPS 80 which comprises a spar structural framework 84 and a PFA flexible structure 88 comprised of sheets of PFA. The structure and payload section 62 is similar to that of FIG. 6 although shown in more detail. In this example, the spar structural framework 84 is a fixed construction that comprises a central hub 85 with spars 86 extending laterally outward. Cross members 87 connect spars 86 at the tips as shown. Additional cross members (not shown) may provide additional connection between the spars to increase stability or provide additional support to the flexible structure 88 when it is attached. The framework 84 may be made of aluminum, titanium, fiber reinforced plastic, fiber reinforced ceramic, or other material having the strength to carry the loads induced by the dynamic pressure of reentry while at the temperatures that framework 84 will see during reentry. This is only an example spar structure and many other configurations are possible. The PFA flexible structure 88 may be attached to the spar structural framework 84 through any of a variety of attachment methods including, for example, fasteners penetrating a portion of the flexible structure 88 and connecting to the framework 84, fasteners passing around or through a portion of framework 84 and attaching to flexible structure 88 on both ends, a portion of flexible structure 88 wrapping around a portion of framework 84 and being fastened to itself, clamping a portion of flexible structure 88 between portions of framework 84, adhesively bonding a portion of structure 88 to framework 84, and other attachment techniques such as those used with current flexible insulation blankets. Other techniques of attaching sheets of thermal protection to spacecraft are well known to those of ordinary skill in the art.

FIGS. 9A-B illustrate an example construction of a deployable spar structural framework as part of a thermal protection system according to certain aspects of the present disclosure. FIG. 9A shows a cross-section of the payload section 62 with a deployable spar structural framework 90 attached to one end. The deployable framework 90 has, in this example, a central post 92 connected at one end to the spacecraft with a hub at the other end. Post 92 is extendable and is shown in the fully retracted position in FIG. 9A. Lateral spars 94, similar to the spars 86 of FIG. 8, are connected to the hub of post 92 at one end. Each spar 94 has a hinge at the other end to which is attached a rotatable spar 96. FIG. 9A is an example of the configuration of the framework 90 at launch, with the post 92 retracted and rotatable spars 96 folded against the sides of the payload section 62 to occupy a minimal amount of space. A flexible structure (not shown) comprised of sheets of PFA is overlaid on and attached to structure 90 in a manner similar to that shown in FIG. 8 and the flexible structure will be folded against the spacecraft as well. FIG. 9B shows the same deployable spar structural framework 90 after deployment on orbit, where post 92 has been extended in the direction of the arrow overlaying post 92 and the rotatable spars 96 have been rotated in the direction of the arrows overlaying the spars 96. The flexible structure (not shown) will be stretched across this extended position of the framework 90. If the spacecraft is moving in the plane of the paper from left to right, it can be seen by comparison of FIGS. 9A and 9B that the configuration of FIG. 9B presents a larger surface area when projected onto a plane perpendicular to the direction of motion. In this example, the configuration of FIG. 9A may be suitable for fitting into a smaller launch vehicle fairing compared to the configuration of FIG. 9B which may have a projected area sized to protect the payload section 62 during reentry. A rigid heat shield of the size of the configuration shown in FIG. 9B would require a larger and more expensive launch vehicle than a TPS of FIGS. 9A and 9B.

FIG. 10 is a flowchart of an example process for fabricating a pyrolyzing flexible ablator according to certain aspects of the present disclosure. Starting at step 200, the first step 205 is to prepare a solution comprising the pyrolyzing material, a solvent, and a cure initiator. The solvent, in addition to other functions, adjusts the viscosity of the solution. The selection of the quantities and types of solvents and cure initiators is well known to those of ordinary skill in the art. The next step 210 is to impregnate a flexible substrate with the solution. This step may be accomplished by placing the flexible substrate on a vacuum table with a dam around the sheet, pouring the solution over the substrate and spreading it to cover the surface of the substrate, covering the substrate and solution with a plastic film and sealing the film to the vacuum table, and then pulling a vacuum between the table and the film. This will force the solution into the interstitial spaces in the flexible substrate. The table, impregnated substrate, and film can be cured in the next step 215 while still under vacuum. This and other techniques of impregnating a flexible substrate with a curable liquid and curing the liquid are well known to those of ordinary skill in the art.

If it is desired to have additional layers of pyrolyzing material on one or both sides of the cured impregnated substrate, decision point 220 will branch to step 225 where additional pyrolyzing material can be added to the existing substrate and then cured in step 230. The step of applying the additional layer of pyrolyzing material may include preparation of the surface of the impregnated substrate by a process such as plasma discharge or application of a bonding agent to the impregnated substrate before application of the new pyrolyzing material. This and other techniques of bonding a curable liquid to a previously cured impregnated substrate are well known to those of ordinary skill in the art. If it is then desirable to add a top layer of a flexible substrate, decision point 235 will branch to step 240 where this top layer can be added. This top layer may be a sheet of impregnated substrate or may be a plain substrate. This layer may be of a different material than the substrate of step 210 or may have a different construction such as a looser weave to allow the gases evolving from the pyrolizing material underneath to escape through the top layer. This layer of flexible substrate is positioned over a portion of the pyrolizing material and may be attached by bonding to the layer of pyrolyzing material or mechanically attached by a method such as stitching.

After completion of the cure process in step 215, the application of any additional layers in steps 225 and 230, and the application of a top layer in step 240, the process is completed and terminates at step 299. This is only an example process flow and other sequences are possible. Cure initiators and the associated curing processes for a given pyrolyzing material are well known to those of ordinary skill in the art. Curing processes include baking the material at an elevated temperature such as described above as well as exposing the uncured material to ultraviolet light or, in the case of a catalyzed reaction that does require an activating environment, simply allowing sufficient time to pass for the curing reaction to be completed. Some pyrolyzing materials may not require a cure initiator and comprise two or more components that are stable by themselves and react when mixed to form a solid.

In summary, a novel flexible heat shield material suitable for use when the heat flux is greater than 5 W/cm$^2$ and thermal protection systems suitable for protecting spacecraft during reentry using this heat shield material have been disclosed. The heat shield material is a pyrolyzing flexible ablator that comprises a flexible substrate made of a high-strength, high-temperature material such as ceramic, carbon, or glass fibers and a low-strength material that releases gas through pyrolysis when exposed to the heat flux and temperature of reentry. The pyrolyzing material may be impregnated into the structural substrate and/or applied as a coating on one or both sides of the substrate. This pyrolyzing flexible ablator can protect against higher levels of heat flux than currently available flexible heat shield materials. Thermal protection systems may be configured as inflatable flexible structures or as flexible structures draped over a spar structure or a continuous surface. The TPS may comprise additional layers of flexible pyrolyzing ablator and/or flexible substrate added over a portion of the flexible structure. Both types of thermal protection systems offer potential reductions in volume at the time of launch and in weight, both of the thermal protection system itself and of the supporting structure.

The previous description is provided to enable any person skilled in the art to practice the various aspects described herein. While the foregoing has described what are considered to be the best mode and/or other examples, it is understood that various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the scope.

It is understood that the specific order or hierarchy of steps in the processes disclosed is an illustration of exemplary approaches. Based upon design preferences, it is understood that the specific order or hierarchy of steps in the processes may be rearranged. In some configurations, some steps may be performed simultaneously. In some configurations, steps may be omitted. The accompanying method claims present elements of the various steps in a sample order, and are not meant to be limited to the specific order or hierarchy presented.

Terms such as "top," "bottom," "front," "rear," "over," "under," and the like as used in this disclosure should be understood as referring to an arbitrary frame of reference, rather than to the ordinary gravitational frame of reference. Thus, a top surface or a front surface may extend upwardly, downwardly, diagonally, or horizontally in a gravitational frame of reference and a first element described as being over a second element may be, in certain configurations, below or in the same horizontal plane as the second element in a gravitational frame of reference.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. A phrase such an embodiment may refer to one or more embodiments and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A pyrolyzing flexible ablator comprising:
    a flexible substrate; and
    a pyrolyzing material that will pyrolyze upon exposure to a heat flux greater than 5 W/cm$^2$, the pyrolyzing material bonded to the flexible substrate.

2. The pyrolyzing flexible ablator of claim 1, wherein the flexible substrate comprises a plurality of fibers or nanotubes.

3. The pyrolyzing flexible ablator of claim 1, wherein the flexible substrate comprises a material having either a melting point or a glass transition temperature greater than 1000 degrees C.

4. The pyrolyzing flexible ablator of claim 3, wherein the flexible substrate comprises a material selected from the group consisting of silicate, carbon, and ceramic.

5. The pyrolyzing flexible ablator of claim 4, wherein the flexible substrate comprises a ceramic selected from the group consisting of $Al_2O_3$, $SiO_2$, $B_2O_3$, $SiC$, $ZrO_2$, and $HfO_2$.

6. The pyrolyzing flexible ablator of claim 1, wherein the pyrolyzing material comprises a material selected from the group consisting of silicones and fluoropolymers.

7. The pyrolyzing flexible ablator of claim 1, wherein the pyrolyzing material is 10-60% of the mass of the pyrolyzing flexible ablator.

8. The pyrolyzing flexible ablator of claim 7, wherein the pyrolyzing material is 25-40% of the mass of the pyrolyzing flexible ablator.

9. The pyrolyzing flexible ablator of claim 1, wherein the pyrolyzing material is impregnated into the flexible substrate.

10. The pyrolyzing flexible ablator of claim 9, wherein the thickness of the pyrolyzing flexible ablator is in the range of 0.010 to 0.150 inches.

11. The pyrolyzing flexible ablator of claim 10, wherein the thickness of the pyrolyzing flexible ablator is in the range of 0.026 to 0.033 inches.

12. The pyrolyzing flexible ablator of claim 9, further comprising a layer of pyrolyzing material covering a portion of and bonded to at least one surface of the impregnated flexible substrate.

13. The pyrolyzing flexible ablator of claim 12, wherein the thickness of the layer of pyrolyzing material is in the range of 0.003 to 0.007 inches.

14. The pyrolyzing flexible ablator of claim 12, further comprising a second flexible substrate positioned over a portion of the layer of pyrolyzing material.

15. A thermal protection system (TPS) comprising:
a pyrolyzing flexible ablator comprising:
a flexible substrate; and
a material that will pyrolize upon exposure to a heat flux greater than 5 W/cm$^2$, the pyrolyzing material bonded to the flexible substrate;
wherein the pyrolyzing flexible ablator is configured to form a flexible structure.

16. The TPS of claim 15, wherein the flexible structure is packable into a first volume and then inflatable to a second volume, wherein the second volume is greater than the first volume.

17. The TPS of claim 15, further comprising a spar structural framework, wherein the flexible structure is attached to the spar structural framework.

18. The TPS of claim 17, wherein the spar structural framework is movable between a first position and a second position, wherein the TPS is configured to have a first projected area when the spar structural framework is in the first position, and wherein the TPS is configured to have a second projected area when the spar structural framework in the second position, the second projected area being greater than the first projected area.

19. The TPS of claim 15, further comprising another pyrolyzing flexible ablator covering a portion of and attached to the flexible structure.

20. A method of forming a pyrolyzing flexible ablator, comprising the steps of:
impregnating a first flexible substrate with a pyrolyzing material that, when cured, will pyrolize upon exposure to a heat flux greater than 5 W/cm$^2$; and
curing the pyrolyzing material.

21. The method of claim 20, further comprising the step of preparing a solution comprising at least one of a pyrolyzing material, a solvent, and a cure initiator.

22. The method of claim 20, further comprising the step of bonding a layer of pyrolyzing material over a portion of at least one surface of the first flexible substrate.

23. The method of claim 22, further comprising the step of positioning a second flexible substrate over a portion of the layer of pyrolyzing material.

\* \* \* \* \*